Patented Jan. 19, 1926.

1,569,871

UNITED STATES PATENT OFFICE.

JACQUE C. MORRELL, OF CHICAGO, ILLINOIS, ASSIGNOR TO THE UNIVERSAL OIL PRODUCTS COMPANY, OF CHICAGO, ILLINOIS, A CORPORATION OF SOUTH DAKOTA.

PROCESS FOR REFINING HYDROCARBON OIL.

No Drawing. Application filed August 31, 1922. Serial No. 585,550.

To all whom it may concern:

Be it known that I, JACQUE C. MORRELL, a citizen of the United States, residing at No. 208 South La Salle Street, in the city of Chicago, county of Cook, and State of Illinois, have invented certain new and useful Improvements in Processes for Refining Hydrocarbon Oil, of which the following is a specification.

This invention relates to a process for refining hydrocarbon oil and refers more particularly to a process in which cracked hydrocarbons having an objectionable sulphur content are treated to remove the objectionable, sulphur and other compounds therefrom.

Among the objects of the invention are to provide a process in which the oil is treated by successive acid and alkali washes to cleanse the oil, and subsequently treated with a plumbite solution and certain objectionable, sulphur and other compounds including metallic sulphide or hydrogen sulphide and others, whereby a finely dispersed precipitate containing some lead is produced in the oil body; to provide a process in which these colloidal particles held suspended in the oil are deposited so that they may easily be removed from the oil by the use of a flocculating agent which coagulates and collects the particles in groups, which are deposited from the oil. Certain hydrocarbons which have been subjected to cracking reaction contain quantities of objectionable, sulphur and other compounds which must be removed in order that they may pass the sulphur test requirement of motor fuel hydrocarbons.

Excessive amounts of objectionable, sulphur and other compounds contained in the oil have a deteriorating effect upon certain metals in the motors and machines, and must be eliminated prior to their use. The oils containing these excessive objectionable compounds are identified particularly with the California, Texas and Mexican fields, although certain hydrocarbons from midcontinent fields are high in sulphur.

In treating the oil to remove these objectionable sulphur and other compounds, the oil may be first thoroughly agitated in the presence of sulphuric acid, in the proportion of say, 600 pounds of acid per 100 barrels of oil, for a period of 15 to 20 minutes more or less. The oil, after separation from the acid and sludge, may be treated with a basic cleansing agent such as caustic soda in the proportion of say, 35 gallons 6–12° B. caustic soda per 100 barrels of oil treated. The oil may be water washed at any time during the treatment. The oil, after being separated from the basic cleansing agent, may be treated with a plumbite solution containing litharge dissolved in caustic soda or sodium hydroxide, in the proportion of say, 5 barrels of 16–30° B. caustic containing from 5 to 30 pounds litharge for each 100 barrels of oil treated. After the removal of the plumbite solution, a sulphide or compound of sulphur, such as an alkaline metal sulphide, may be added, in the proportion of say, 4 to 20 pounds per 100 barrels. The sulphide may be used in conjunction with the preliminary plumbite treat. This treat produces a precipitate containing some lead, which sometimes has a tendency to remain suspended over an indefinite period in the body of the oil.

Emulsification of the oil is also sometimes caused by this fine precipitate. An important feature of this invention is to prevent this suspension formation and produce the deposit of the finely divided suspended particles in order that the oil may be clarified and refined to a clear, stable water white distillate. In producing this deposit, use is made of various electrolytes, especially dilute acids such as sulphuric acid and hydrochloric acid in the proportion of say, $\frac{1}{10}$ to $\frac{1}{2}$ of 1% by weight of oil treated. The use of such electrolytes or acids to produce water white distillate must not be confounded with their employment in the treating of oils, as particular care is taken to select the concentration of the acid to avoid such reactions as would occur with concentrated acids such as sulphuric upon cracked hydrocarbons.

The reaction is of a colloidal nature in producing the coagulating or flocculating of the finely suspended particles of the precipitate in the oil body. Oil that has been treated with cleansing washes, plumbite and sulphide treats will usually have this colloidal precipitate, containing some lead sulphide suspended in the oil body. The addition of an electrolyte either by an electrical phenomena or chemical reaction causes the deposit of this finely dispersed precipitate so that it may be readily removed from the oil body.

In addition to the coagulation and flocculating effect of the electrolyte there are other reactions which take place, as for example dilute hydrochloric acid agitated with the oil which has been treated with sodium plumbite and a soluble sulphide to remove the sulphur compound gives a remarkable light and refined product more free from sulphur compounds than that produced without its use. These dilute acids can then be washed out in water, and the resulting oil distilled preferably in the presence of steam to produce a stable water white sweet odored product.

I claim as my invention:

1. A step in a process for refining or purifying hydrocarbon oils, consisting in subjecting the oil to treatment with sodium plumbite in water solution, in extracting the sodium plumbite solution, in then introducing a sulphide in water solution, withdrawing the products of this reaction and then introducing a flocculating agent to precipitate the other products of reaction, and in then withdrawing the precipitated material.

2. A step in a process for refining or purifying hydrocarbon oils, consisting in subjecting the oil to treatment with sodium plumbite in solution, in then extracting the sodium plumbite solution, in then subjecting the oil to treatment with a water soluble sulphide to assist the reaction produced by sodium plumbite solution, in then removing the reaction products formed by the above treatment, and in then adding a flocculating agent to precipitate reaction products formed by the above treatment and still present in the oil, and in then removing the separated precipitate and reaction products.

JACQUE C. MORRELL.